No. 693,818. Patented Feb. 18, 1902.
W. F. STEARNS & W. L. HAINES.
PNEUMATIC TIRE.
(Application filed Aug. 17, 1901.)
(No Model.)
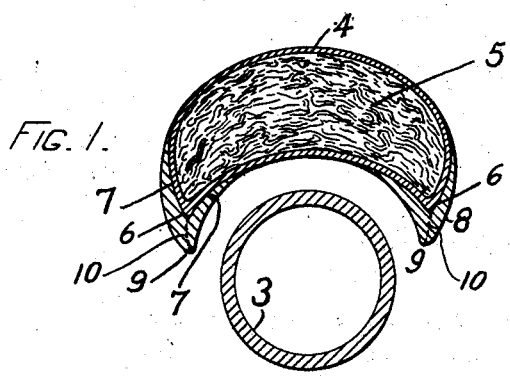
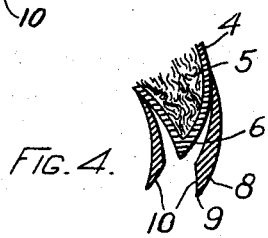
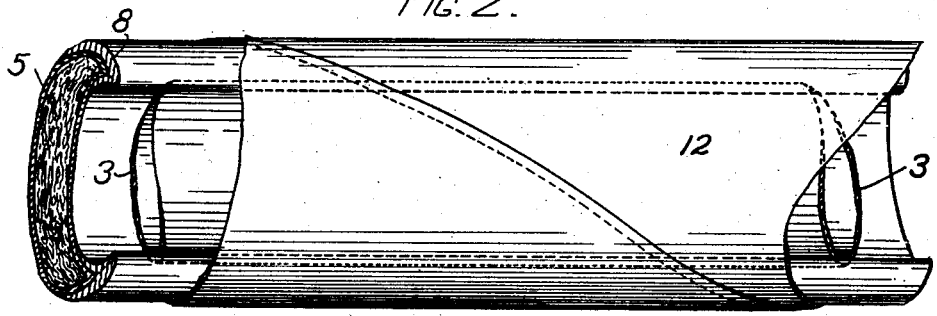
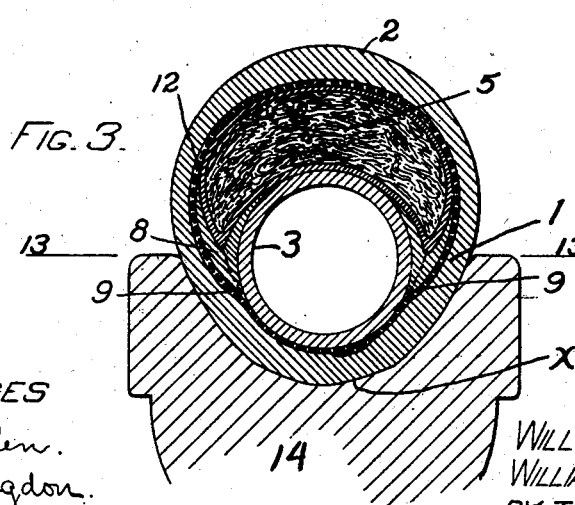
WITNESSES
E. A. Allen.
A. L. Hodgdon.
INVENTORS
WILLIAM FRANCIS STEARNS
WILLIAM LEAVITT HAINES
BY THEIR ATTORNEY
Edward S. Beach.

UNITED STATES PATENT OFFICE.

WILLIAM FRANCIS STEARNS, OF CAMBRIDGE, AND WILLIAM LEAVITT HAINES, OF BOSTON, MASSACHUSETTS, ASSIGNORS, BY MESNE ASSIGNMENTS, TO PUNCTNOT TIRE COMPANY, OF CAMDEN, NEW JERSEY, AND PHILADELPHIA, PENNSYLVANIA, A CORPORATION OF NEW JERSEY.

PNEUMATIC TIRE.

SPECIFICATION forming part of Letters Patent No. 693,818, dated February 18, 1902.

Application filed August 17, 1901. Serial No. 72,324. (No model.)

*To all whom it may concern:*

Be it known that we, WILLIAM FRANCIS STEARNS, residing at Cambridge, in the county of Middlesex, and WILLIAM LEAVITT HAINES, residing at Boston, in the county of Suffolk, State of Massachusetts, citizens of the United States, have invented certain new and useful Improvements in Pneumatic Tires, of which the following is a specification, reference being had therein to the accompanying drawings.

Figure 1 is a cross-sectional view of our new puncture-resisting crescent-shaped pad provided with V-ribs, of elastic material, along its edges and of the air-tube upon which the concave wall of the pad and inner portions of the V-shaped ribs are bent and confined by the wrapping shown in Fig. 2. Fig. 2 is a view looking from the inner periphery of the assembled parts of our new pad assembled, with the air-tube and wrapping which encircle them. Fig. 3 is a cross-sectional view of a completed tire mounted in a suitable rim or felly. Fig. 4 is a detail showing how the V churn-resisting ribs are each made of two strips of suitable elastic material.

The main object of our invention is to produce a pneumatic tire (comprising a suitable outer sheath, air-tube, and puncture-resisting-pad casing, all being made of vulcanizable material) which will be better adapted than any heretofore made for use on road-vehicles drawn by animals or propelled by motors. The heavy loads and hard usage to which this class of vehicles is subjected have developed, as is well known, many weaknesses in pneumatic tires originally designed with special reference to bicycles and other man-driven vehicles and proved that many pneumatic tires which are well adapted for use on wheels of the latter class of vehicles are not durable or become of impaired resiliency when used on vehicles of the former class. Vehicles drawn by animals or propelled by motors commonly have four wheels and are usually intended to support heavy loads, and in the case of automobiles not only to support heavy loads, but also to endure the strains incident to very high speed. In animal-drawn, and especially in motor-propelled, vehicles the vertical churning to which pneumatic tires are subjected tends to disintegrate or rupture the sides of the tire at or near a transverse line coincident with the outer edges of the rim or fellies in which the tire is socketed on the wheel. For convenience of description we call this the "felly-line," and hereinafter designate it by reference to the drawings. The tendency to rupture or disintegration at or near the felly-line of the tire is augmented by the laterally-flexing strains to which the tires are subjected in turning corners and in cramping when turning around. The vertical and laterally-flexing strains exerted on the tires not only impair the intermolecular tenacity of the rubber used, but also tend to and frequently do separate the rubber and the textile material commonly embedded in the rubber portions of the tires. Hence the marked and well-recognized structural weakness of pneumatic tires for heavy and high-speed vehicles at or near the felly-line. So far as we are aware, no one heretofore has either obviated or shown any means for obviating this defect.

One important object of our invention is to overcome this serious defect.

Another important object of our invention is to produce an approximately puncture-proof pneumatic tire. While we do not state that our new tire is absolutely non-puncturable, we do state that it is non-puncturable to a very high degree, and this important quality of our new tire is due to a novel construction hereinafter described.

Another object of our invention is to make the fibrous filling of our new puncture-resisting pad highly non-absorbent of moisture, and this is accomplished by materially increasing the compactness of the fibers of the filling of our new puncture-resisting pad, and this increased compactness we obtain by means hereinafter described.

Our new tire resembles many in the prior art in so far, generally considered, as it comprises an appropriate outer sheath having a suitable tread-surface, an inner inflatable air-tube, and a puncture-resisting pad having a fibrous filling. Yet it differs essentially from all such tires heretofore made in the important structural and useful respects hereinafter claimed as new.

We are aware in the prior art of the tires set forth in United States Patents No. 504,144, to Williams, dated August 29, 1893; No. 506,594, to Kepler and Wegner, dated October 10, 1893; No. 521,005, to Schindel, dated June 5, 1894; No. 521,006, to Schindel, dated June 5, 1894; No. 526,846, to Schindel, dated October 2, 1894; No. 556,931, to Jeffrey, dated March 24, 1896; No. 557,709, to Smith, dated April 7, 1896; No. 611,594, to Kempshall, dated September 27, 1898, and No. 634,920, to Taylor, dated October 17, 1889, and disclaim the inventions described therein. We are also aware of the United States Patent No. 639,951, issued to Taylor December 26, 1899, and recognize this patent as a part of the prior art. None of these patents in the prior art describes a structure which, like our present one, either overcomes the tendency to rupture or disintegrate at or near the felly-line, or our new means for producing the highly-effective puncture-resisting quality that characterizes our new tire.

In the drawings illustrating the principle of our invention and the best mode now known to us of applying that principle, 1 is one form of outer sheath having a tread-surface 2. The sheath may be any desired one of the many forms of outer sheaths already known.

3 is the inflatable air-tube.

4 is the casing of the puncture-resisting pad, the fibrous filling of which is marked 5. The pad is approximately crescent-shaped in cross-section, and the filling is preferably of long-staple cotton the fibers of which are arranged in approximate parallelism and subjected to heat, so that they are interlocked or felted by the heat, the interlocking being effected by the crinkling of the individual fibers and aiding in securing the compactness of the filling hereinafter mentioned. The greater the compactness of the filling the less absorbent of moisture it is. If the filling is heated over smoking lamps, as it may be, the fibers will become darkened in color by the slight deposit of carbon in and on the fibers, and the carbon deposit increases to a certain extent the compactness of the filling when it is in compressed form. With the exception of such slight carbonization (which we do not either claim or consider an essential part of our invention, broadly considered) we prefer to add nothing to the fiber, because we consider that tar, resin, and other material heretofore incorporated with such fibrous filling to increase compactness and reduce absorption impair the resiliency of the fibrous filling, and our object is to keep it as lively as possible consistently with the compactness required to enable it to resist puncture, and our experience leads us to believe that the incorporation of foreign substances or material in fibrous fillings of the pads decreases the resiliency of the tire and diminishes its serviceability.

Pad-casing 4 is provided along its edges 6 and along each adjacent inner and outer margin 7 with a V-shaped churn-resisting rib 8, each edge 6 and thereto-adjacent marginal portions 7 being inserted in the V of the rib 8 and the rib and opposed parts of the pad-casing 4 being vulcanized together. It may be noted here that the sheath, pad-casing, and air-tube are made of rubber or vulcanizable compounds. The apices 9 of the V-shaped ribs project inwardly beyond the apices or edge 6 of the pad-casing for a purpose hereinafter stated. In practice the V-ribs are conveniently formed, for economy of labor and material, of two strips of rubber applied along the margins 7 and extending inwardly beyond the edges 6, where they are united by vulcanization along the dotted lines 10. (See Fig. 1.) It is important that the concave wall of pad-casing 4 should be of unrestrained flexibility, and by this we mean that it should not have incorporated in it or attached to either of its sides any duck or other textile fabric.

Air-tube 3 is mounted in the concavity of the crescent-shaped-pad casing without any intervening pressure-resisting material being interposed therein between. The air-tube is preferably all rubber—that is, is without any duck or textile material—so that the wall of the air-tube opposed to the concave wall of the pad-casing 4 is freely distensible or of inherently unrestricted expansibility in the direction of the filling within the pad-casing 4.

When assembled, the pad-casing 4 and the air-tube are firmly bound together by one or more textile wrappers 12, (one wrapper being shown,) which encircles them and is brought suitably together at its free ends—for example, as shown in Fig. 2. The wrapper adheres to the opposed surfaces of the pad-casing and air-tube and bends the marginal portions of the pad-casing inwardly on the air-tube, so that the apices 9 of the V-ribs will when the wrapped air-tube and pad-casing are inclosed in the outer sheath 1 extend from above the felly-line 13 13, Fig. 3, past the felly-line and inwardly well toward the bottom of the tire-seat $x$ in the felly or rim 14. The outer surface of the wrapper or inner surface of the sheath may be provided with a suitable composition or cement, so that in the process of vulcanization the sheath and wrapper will be permanently united to prevent creeping or circumferential movement of one part in relation to the other, and the contacting walls of the pad-casing and air-tube are similarly prepared prior to the vulcanizing process, whereby all the vulcanizable parts are permanently united.

When our new tire thus constructed is inflated, the wrapper 12 strongly resists distension, and the consequence is that as the opposed walls of the air-tube and pad-casing are of inherently-unrestrained expansibility the air-pressure pushes these walls toward the filling, compressing it to a degree corresponding to the force of the air-pressure, so that the force of the air-pressure is fully utilized and concentrated on the concave side of the filling. In some prior constructions textile or fibrous material has been interposed between the opposed wall portions of the air-tube and pad-casing, with the result that air-filled bulbous projections appeared on the outer surface of the air-tube under weak places in the interposed fabric, worked through the fabric, and burst when the vehicle was heavily loaded or too severely jolted. The escaping air then worked its way out to the valve-spindle or to the lug-openings of the tire, and the tire became more or less deflated. To obviate such a defect, we make the opposed pad-casing and air-tube walls of inherently-unrestrained expansibility.

If the compression or flexing of pneumatic tires when in use be considered, it will be observed that the sides of the tire just above the felly-line must not be continually bulged outwardly and strained laterally. This movement is commonly known as "churning" of the tire, and the disintegration or rupture of pneumatic tires at or near the felly-line is one of the two grave objections to pneumatic tires on road-vehicles drawn by animals or propelled by motors. The other objection is puncturability.

To resist in a measure the compression which occasions this destructive churning of the sides of the tire and to strengthen the side portions of the tire, so that it will better withstand the strains occasioned by the churning, we have added the V-shaped churn-resisting ribs 8 to the opposed edges 6 and margins 7 of the concavo-convex pad-casing 4 and combined the parts, as already set forth and as shown in Figs. 2 and 3, so that the felly-line passes between the outer and inner extremities of the ribs 8, which thus give a high degree of strength to the sides of the tire at and near the points where tires have heretofore frequently ruptured. The V-ribs greatly increase the serviceability of the tires.

The reason for having the fibers of the filling in approximate parallelism is to increase the effective compactness of the filling when it is compressed. If the fibers were in separate wads, the filling would not be as compact as is requisite to resist and largely prevent puncture.

The features of our invention may be embodied in other forms of tires than that herein shown without departure therefrom.

The V-ribs not only add to the durability of the tire for reasons stated, but also increase the resiliency of the tire when the vehicle rises and falls vertically, because of their then vertically-cushioning effect.

It is more economical to make the V-ribs out of two strips, each of the proper cross-sectional contour, as shown in Fig. 4, than it would be to make each V-rib out of a single piece of stock, and such construction is a feature of our invention.

What we claim is—

1. As a new article of manufacture, a crescent-shaped puncture-resisting pad for pneumatic tires, said pad comprising a crescent-shaped-pad casing and a fibrous filling therein, combined with a pair of V-shaped churn-resisting ribs of elastic material, each edge and the thereto-adjacent marginal portions of the crescent-shaped-pad casing being mounted in the V of one of said ribs.

2. As a new article of manufacture, a crescent-shaped puncture-resisting pad for pneumatic tires, said pad comprising a crescent-shaped-pad casing and a fibrous filling therein, combined with a pair of V-shaped churn-resisting ribs of elastic material, each edge and the thereto-adjacent marginal portions of the crescent-shaped-pad casing being mounted in the V of one of said ribs; said filling being made of long-staple crinkled cotton.

3. As a new article of manufacture, a crescent-shaped puncture-resisting pad for pneumatic tires, said pad comprising a crescent-shaped-pad casing and a fibrous filling therein, combined with a pair of V-shaped churn-resisting ribs of elastic material, each edge and the thereto-adjacent marginal portions of the crescent-shaped-pad casing being mounted in the V of one of said ribs; said filling being made of long-staple crinkled cotton, the fibers whereof are arranged in approximate parallelism whereby an increased effective compactness of the filling is obtained.

4. In a pneumatic tire, the combination of a suitable outer sheath having a tread-surface; a puncture-resisting pad comprising a fibrous filling; an inflatable air-tube; the pad being mounted between the outer wall portion of the air-tube and the tread portion of the sheath; and a wrapping encircling the air-tube of the pad; the opposed walls of the air-tube and pad being of inherently-unrestrained expansibility toward the filling, and vulcanized together; and the opposed walls of said air-tube and pad being vulcanized together, whereby the sheath, air-tube and pad are held in permanent relative positions, one to the other; and whereby the wrapped walls of the air-tube and pad are relatively non-expansible while the opposed walls thereof are freely expansible, when the air-tube is inflated and compresses the filling.

5. In a pneumatic tire, the combination of a suitable outer sheath having a tread-surface; an interior, inflatable air-tube; a crescent-shaped puncture-resisting pad comprising a fibrous filling; V-ribs of elastic material in the V's of which the respective edges and marginal portions of the pad are mounted; said pad being mounted between the outer surface of the air-tube and the opposed wall of the sheath with said V-ribs extending in opposite directions on each side of the felly-line of the tire; and a winding encircling the air-tube and the pad; the opposed wall portions of the air-tube and pad being of inherently-unrestrained expansibility in the direction of the tread of the tire, and vulcanized together; and the opposed surfaces of the air-tube and sheath being vulcanized together; and the opposed surfaces of the sheath and pad being vulcanized, whereby the pad is compressed when the air-tube is inflated without producing air-filled, bulbous projections of the air-tube toward the concave wall of the pad, and whereby rupture of the tire at or near said felly-line is minimized.

6. As a new article of manufacture, a pneumatic tire, comprising a suitable outer sheath; a puncture-resisting pad having a suitable fibrous filling; an air-tube; the pad being mounted between the air-tube and tread side of the sheath; and, along each edge and thereto-adjacent margins of the pad, a pair of elastic strips united to said margins and, inwardly from said edge united to each other, whereby the pad is provided with ribs which resist strains tending to rupture the tire at or near such side portions of the tire as are opposed to said united strips.

In testimony whereof we affix our signatures in presence of two witnesses.

WILLIAM FRANCIS STEARNS.
WILLIAM LEAVITT HAINES.

Witnesses:
EDWARD S. BEACH,
E. A. ALLEN.